United States Patent
Hopkins et al.

(10) Patent No.: US 11,915,076 B2
(45) Date of Patent: Feb. 27, 2024

(54) WRISTBAND CONFIGURATION FOR RECEIVING AN ACCESSORY

(71) Applicant: Zebra Technologies Corporation, Lincolnshire, IL (US)

(72) Inventors: Allison Hopkins, Lake Zurich, IL (US); Jessica Bicek, Chicago, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 27 days.

(21) Appl. No.: 17/388,646

(22) Filed: Jul. 29, 2021

(65) Prior Publication Data

US 2023/0035560 A1 Feb. 2, 2023

(51) Int. Cl.
| | | |
|---|---|---|
| *G06K 19/02* | (2006.01) | |
| *B41J 3/407* | (2006.01) | |
| *G09F 3/00* | (2006.01) | |
| *G06K 7/10* | (2006.01) | |
| *B41J 3/50* | (2006.01) | |

(52) U.S. Cl.
CPC .......... *G06K 19/025* (2013.01); *B41J 3/4075* (2013.01); *B41J 3/50* (2013.01); *G06K 7/10108* (2013.01); *G09F 3/005* (2013.01)

(58) Field of Classification Search
CPC . G06K 19/025; G06K 7/10108; B41J 3/4075; B41J 3/50; G09F 3/005
See application file for complete search history.

(56) References Cited

U.S. PATENT DOCUMENTS

| | | | | |
|---|---|---|---|---|
| 4,906,025 A | * | 3/1990 | Schreindl | B42D 5/006 224/267 |
| 5,516,393 A | * | 5/1996 | Freedman | B32B 38/0012 156/289 |
| 6,349,493 B1 | * | 2/2002 | Newman | G09F 3/005 40/633 |
| 2007/0169248 A1 | * | 7/2007 | Yang | G09F 3/005 2/162 |
| 2009/0265971 A1 | * | 10/2009 | Cook | G09F 3/005 224/267 |
| 2012/0186121 A1 | * | 7/2012 | Hanssen | A44C 5/0053 40/633 |

(Continued)

FOREIGN PATENT DOCUMENTS

CN 209574917 U * 11/2019

OTHER PUBLICATIONS

CN 209574917, Timing and Indicating Function Featured Surgical Patient Antimicrobial Wristband, Has Micro-timing Buzzer Provided with Buzzer, LCD Screen, Switch Button, Operation Button and Magnetic Base, Where Base is Connected with Female Buckle of Plastic Shell, 4 pages. (Year: 2022).*

*Primary Examiner* — Tuyen K Vo

(57) ABSTRACT

A wristband configuration for receiving an accessory is described herein. In some implementations, a wristband includes a first side that includes a printable section of the wristband that includes a print coating. The wristband may include a second side, opposite the first side, that includes. The wristband may include may include a comfort coating, and an adhesive material on an adhesive section of the wristband. The wristband may include a receiving hole pattern that is configured to receive an accessory associated with the wristband and secure the accessory to the wristband when worn by a wearer.

20 Claims, 3 Drawing Sheets

(56) References Cited

U.S. PATENT DOCUMENTS

| | | | |
|---|---|---|---|
| 2013/0161937 A1* | 6/2013 | Takashima | B42D 25/28 |
| | | | 283/75 |
| 2015/0052943 A1* | 2/2015 | Inglis | A44C 17/0208 |
| | | | 63/3 |
| 2015/0242120 A1* | 8/2015 | Rodriguez | G06F 3/04886 |
| | | | 345/173 |
| 2015/0296935 A1* | 10/2015 | Rana | A44C 5/0007 |
| | | | 63/3 |
| 2017/0224070 A1* | 8/2017 | Simones | A44C 5/0053 |

* cited by examiner

WRISTBAND CONFIGURATION FOR RECEIVING AN ACCESSORY

TECHNICAL FIELD

The present disclosure relates generally to wristband configurations and, for example, to a wristband configuration for receiving an accessory.

BACKGROUND

A disposable wristband can be used in a variety of applications. For example, such a wristband can be utilized for verification of access or entry to a secure area, such as a hospital and/or entertainment venue, among other examples. In some cases, a disposable wristband may be configured from a material that is relatively stronger than other materials, in order to ensure that the disposable wristband is secured to the wearer. However, a disposable wristband formed from such a material is more likely to irritate a wearer's skin (e.g., cause abrasions or wounds), due to the rigidity of the material. Accordingly, there is a need for a configuration of a disposable wristband that is capable of maintaining a certain level of strength without increasing irritability or harm to a wearer's skin.

DETAILED DESCRIPTION

Figure 1:
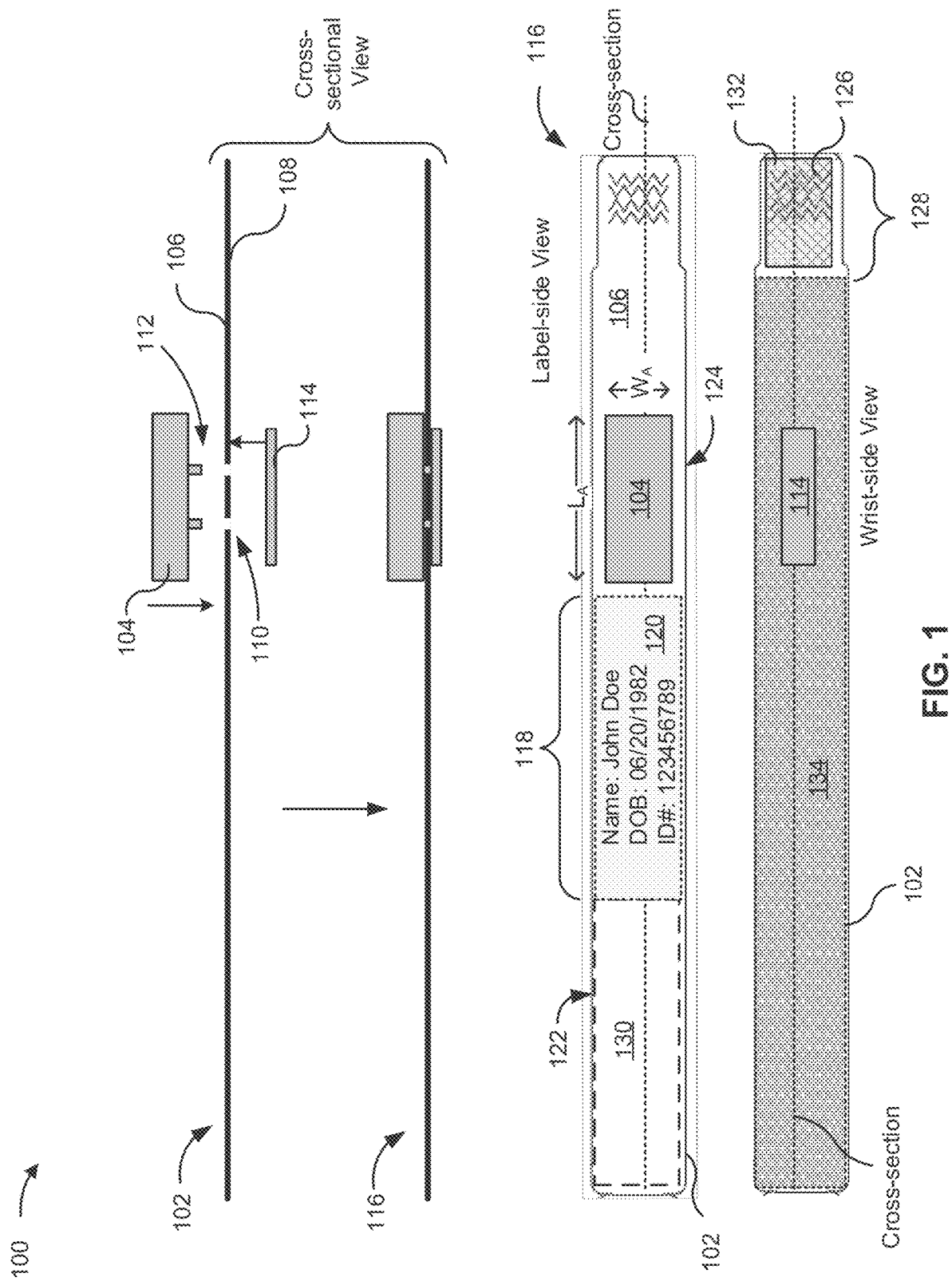
FIG. 1 is a diagram of an example implementation associated with a disposable wristband and an accessory, as described herein.

The following detailed description of example implementations refers to the accompanying drawings. The same reference numbers in different drawings may identify the same or similar elements.

In some instances, a wristband may be configured to provide (e.g., via a printed label and/or a radio frequency identification (RFID) tag) or indicate information associated with a wearer of the wristband. Furthermore, such a wristband may be a disposable wristband or other type of wristband that is intended for a single use (or temporary, relatively short-term use) by an individual or organization. For example, the wristband may utilize an adhesive or clasp that is configured to permit the wristband to be formed around a wearer's wrist (or ankle or other body part) only once. In some cases, such a wristband may be customized for a wearer or single use on-demand, for example, by printing a label (or other content) onto the wristband to indicate an intended use or purpose of the wristband. As a more specific example, a wristband may be created and/or printed to identify a patient or an account of a patient while the patient is admitted to a hospital.

However, because a disposable wristband is configured for a single use, formed from materials that reduce waste and/or cost, and is typically designed for comfort of a wearer of the disposable wristband, such a wristband may not have a required strength or rigidity to support certain accessories (e.g., accessories that have a certain mass), especially accessories configured to be received through receiving holes. In some cases, an accessory may be attached to a wristband to provide an additional use to the wristband. For example, the accessory may include a locationing beacon, a healthcare monitor, or another type of monitoring unit that is clipped and/or clamped to a wristband to monitor a patient at a hospital. While an accessory may utilize a clip or clamp to attach to a disposable wristband, the mass of the accessory is typically relatively close to an edge contour of the wristband (because the clip or clamp goes around the edge contour). Furthermore, such a clip or clamp can be insecure and frequently use of a clip or claim can result in the accessory being easily detached from the wristband (e.g., when the accessory comes into contact with another object). In some cases, an accessory may have pegs or other structures that are to be received through a wristband to secure the locationing beacon to the wristband (e.g., rather than a clip or clamp that attaches an accessory on or around an edge of the wristband). In such a case, the wristband may include one or more receiving holes.

Moreover, in some instances, a wristband printer used to customize a disposable wristband on-demand may include one or more sensors for monitoring a printing operation that prints a label onto the disposable wristband. For example, a wristband printer sensor may be configured to detect whether a disposable wristband has been received within or fed through a feeding mechanism of the printer. Accordingly, if the print sensor is aligned with a receiving hole, the print sensor may misinterpret the receiving hole as an end of the disposable wristband, and correspondingly end the printing operation. Accordingly, there is a need for a disposable wristband to be able to receive and support an accessory, prevent or reduce irritation to a wearer's skin, and permit the disposable wristband to receive a label (or other content) without interrupting a print operation of a wristband printer that is configured to print on a disposable wristband (regardless of whether the disposable wristband is to include the accessory or not).

Some implementations described herein provide a disposable wristband that is configured to securely receive and support an accessory, such as a locationing beacon, when worn by a wearer. The disposable wristband, as described herein, may be formed from a wristband web that has a certain amount of strength (or rigidity) to support the accessory and includes a coating on a wrist-side of the disposable wristband to prevent or reduce irritation to a wearer's skin. In some implementations, the disposable wristband may include a coating on a label-side of the wristband (which is opposite the wrist-side) that permits a wristband printer to print a label (or other content) onto the wristband. Furthermore, the disposable wristband may include a receiving hole pattern that includes one or more holes. The one or more holes may be positioned outside of a sensed region of the disposable wristband that is monitored by a wristband printer sensor of a wristband printer, thereby permitting a wristband printer to print a label or other content onto the disposable wristband.

In this way, as described herein, a disposable wristband and/or wristband web can be configured to receive and support an accessory while having a configuration that provides increased comfort or reduces irritation of skin of a wearer (e.g., relative to other wristbands, such as other disposable wristbands with a same or similar rigidity as a disposable wristband described herein). Moreover, a disposable wristband, as described herein, may have a receiving hole pattern that permits a wristband printer to print a label onto the disposable wristband without the wristband printer being reconfigured (e.g., via a software update or a hardware update) to account for the disposable wristband including holes.

In some implementations, a wristband includes a first side that includes a printable section of the wristband that includes a print coating; a second side, opposite the first side, that includes a comfort coating, and an adhesive material on an adhesive section of the wristband; and a receiving hole pattern that is configured to receive an accessory associated with the wristband, and secure the accessory to the wristband when worn by a wearer.

In some implementations, a wristband web includes a wristband material; a print coating on printable sections of a first side of the wristband material; an adhesive material on adhesive sections of the first side of the wristband material; and a comfort coating on a second side of the wristband material that is opposite the first side of the wristband material, wherein a plurality of wristbands are formed within the wristband web, and wherein an individual wristband, of the plurality of wristbands, includes a receiving hole pattern for receiving and securing an accessory to the wristband.

In some implementations, a wristband web includes a plurality of wristbands, wherein each wristband, of the plurality of wristbands, is formed from the wristband web to include: an adhesive material on an adhesive section of a first side of the wristband, and a printable section that includes a print coating on a printable section of the first side; a comfort coating on a second side of the wristband that is opposite the first side; and a receiving hole pattern that includes holes for receiving and securing individual accessories to each wristband, wherein the holes extend from the first side to the second side.

FIG. 1 is a diagram of an example implementation 100 associated with a disposable wristband and an accessory, as described herein. As shown in FIG. 1, example implementation 100 includes a disposable wristband 102 and an accessory 104. The disposable wristband 102 may be formed from a wristband web and/or a material of a wristband web. The accessory 104 may have a mass of at least 2.5 grams (g). In some implementations, the disposable wristband 102 may be formed from (or include) a polyethylene material or other type of material that has a threshold level of strength to support the accessory 104 when the disposable wristband 102 is worn by a user, as described herein. In some implementations, a wristband material used to form the disposable wristband 102 may have a tensile strength of at least 1.4 kilograms of force per square centimeter (kg/cm²) to support the mass of the accessory 104. In this way, the disposable wristband 102 may have a strength and/or rigidity that is configured to support the accessory 104 (e.g., without tearing or ripping when worn according to a typical use of the disposable wristband 102).

As shown in FIG. 1 and in a cross-sectional view of the disposable wristband 102 and the accessory 104, the disposable wristband 102 includes a label side 106 (e.g., a first side) and a wrist side 108 (e.g., a second side) that is opposite the label side 106. The disposable wristband 102 includes a receiving hole pattern 110 that is configured to receive the accessory 104 and/or permit the accessory 104 to be supported by the disposable wristband 102. For example, the accessory may include a set of pegs 112 (or other type of structure) that are to be received through holes of the receiving hole pattern 110. Accordingly, the receiving hole pattern 110 may include multiple holes that are configured within the receiving hole pattern 110 (e.g., within an area of the disposable wristband 102 that includes the receiving hole pattern 110). The receiving hole pattern 110 may include holes that are shaped and/or sized to receive the pegs and/or that are arranged in a pattern that corresponds to a layout of the pegs on the accessory 104. Accordingly, individual holes of the receiving hole pattern 110 are configured or positioned within the receiving hole pattern 110 to receive corresponding pegs of the accessory 104. The accessory 104 may be associated with or include a backing 114 that is configured to secure the accessory 104 to the disposable wristband 102 (e.g., after the set of pegs are received through the holes of the receiving hole pattern 110). Accordingly, the receiving hole pattern 110 may be configured to receive and/or secure the accessory 104 to the disposable wristband 102 when worn by a wearer (without the use of a clip or clamp).

As shown in FIG. 1, when the accessory 104 is secured (or attached) to the disposable wristband 102 by attaching the backing 114 to the set of pegs 112, an accessorized disposable wristband 116 may be formed. In this way, such an arrangement is formed without using a clip or clamp that attaches the accessory 104 to the disposable wristband 102 (e.g., around an edge of the disposable wristband 102). Accordingly, the accessorized disposable wristband 116 provides an arrangement of a disposable wristband and an accessory that enables the accessory to be better secured to the disposable wristband (relative to other arrangements of disposable wristbands and accessories), since a collision between an object and the accessory 104 would not cause a clip or clamp to lose grip on the disposable wristband 102.

As further shown in FIG. 1, in a label-side view of the accessorized disposable wristband 116, the label side 106 of the disposable wristband 102 includes a printable section 118 of the disposable wristband 102. The printable section 118 may include a print coating 120 that permits a wristband to print a label (or other content) on the disposable wristband 102. For example, as shown, the label may include a name, date of birth (DOB), and identification number (ID #) of a wearer of the disposable wristband 102. The print coating 120 may include any suitable coating that facilitates printing or receiving printed content on the disposable wristband 102.

The accessory 104 is shown in the label-side view with a length LA and a width WA. In some implementations, a length of the printable section 118 may be based on the length of the accessory 104. In some implementations, the width of the accessory 104 may satisfy a threshold percentage of a maximum width of the disposable wristband 102. For example, the width of the accessory 104 may be at least 50% or more of the maximum width of the disposable wristband 102. In some implementations, the maximum width of the disposable wristband 102 is between 20 mm and 30 mm.

The disposable wristband may have a first edge contour 122 extending along a longitudinal direction of the disposable wristband 102 and a second edge contour 124 extending along the longitudinal direction. The maximum width of the disposable wristband 102 may be defined by the first edge contour 122 and the second edge contour 124 of the disposable wristband 102. In some implementations, a central longitudinal axis of the accessory 104 may be configured to be centered between the first edge contour 122 and a second edge contour 124 of the disposable wristband 102 in order to distribute the mass of the accessory 104.

In a wrist-side view of the accessorized disposable wristband 116, the wrist side 108 may include an adhesive material 126 on an adhesive section 128 of the disposable wristband 102. When the disposable wristband 102 is to be worn by a wearer, the adhesive material 126 may be attached to an adhesive receiving section 130 of the label side 106. For example, the disposable wristband 102 may be wrapped around the wrist of a wearer to permit the adhesive material 126 to be attached to the adhesive receiving section 130. The adhesive receiving section 130 may be associated with or a portion of the printable section 118. Accordingly, when worn by a wearer, a portion of the printable section 118 may overlap the adhesive section 128 (or vice versa)

The adhesive section 128 may include a configuration of cuts 132 that are configured to cause the adhesive material 126 and/or adhesive section 128 to be destroyed and/or unusable when the disposable wristband 102 is removed from the wearer. In this way, the configuration of cuts may be configured to enable the disposable wristband 102 to be attached to the adhesive receiving section 130 (or other object) only once, thereby preventing reuse of the disposable wristband 102 after the disposable wristband 102 has been worn by a wearer.

The wrist side 108 of the disposable wristband 102 may include a comfort coating 134 that is configured to coat (at least partially) the wrist side 108 of a material of a wristband web used to form the disposable wristband 102. The comfort coating 134 may include a polypropylene coating that is laminated to the wrist side 108 of the disposable wristband 102. In some implementations, the comfort coating 134 may be a printed layer of the disposable wristband 102 (e.g., a varnish layer that is printed to a wristband material of the disposable wristband 102). The comfort coating 134 may be a different type of coating (e.g., formed from a different type of material) than the print coating 120.

In some implementations, the accessory 104 may include a device that is configured to wirelessly communicate with a system to monitor a wearer of the disposable wristband. For example, the accessory 104 may include a locationing beacon that is configured to indicate (e.g., to a locationing system of a facility) a location of a wearer of the disposable wristband 102. More specifically, a hospital may track a patient's location within the hospital (so that the patient can easily be found, if needed) using the accessory 104, when the accessory is attached to the disposable wristband and/or the disposable wristband 102 is worn by the patient. Accordingly, the accessory 104 may be received by the disposable wristband 102 via the receiving hole pattern 110 to permit a location of a patient to be tracked while the patient is in the hospital and wearing the accessorized disposable wristband 116. The disposable wristband 102 may have a required level of strength to support the accessory while the patient is the hospital, and include a print coating that permits a label or content to be printed on the label. Furthermore, the disposable wristband 102 may include the comfort coating to prevent or reduce irritation of the patient's skin while the patient is wearing the accessorized disposable wristband 116.

As indicated above, FIG. 1 is provided as an example. Other examples may differ from what is described with regard to FIG. 1. For example, although the adhesive section 128 is shown on the wrist side 108, the adhesive section 128 may be on the label side 106 in other examples (e.g., so that the adhesive material 126 is on a same side as the print coating 120 and/or the printable section 118).

Figure 2:
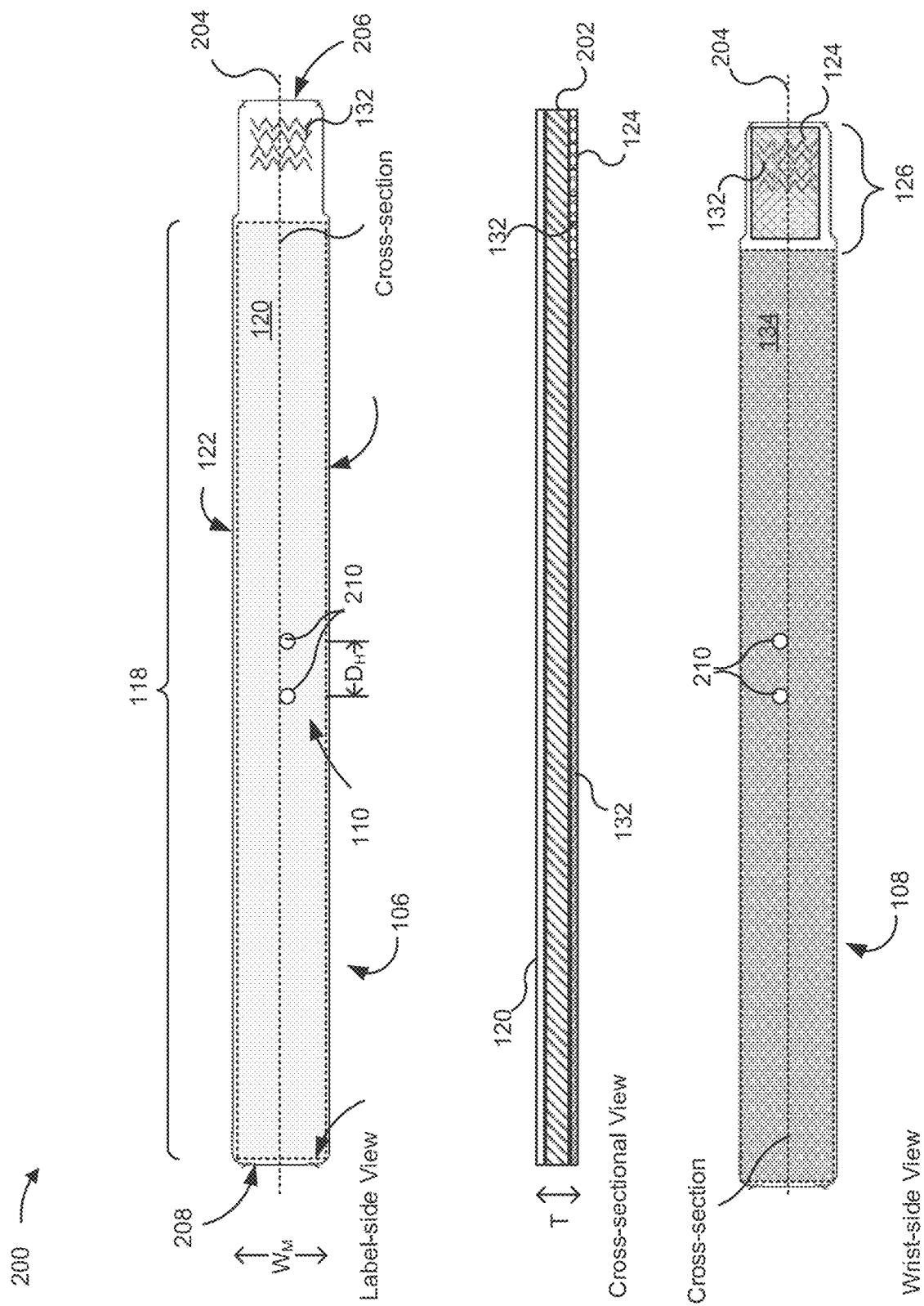
FIG. 2 is a diagram of an example implementation of a disposable wristband described herein.

FIG. 2 is a diagram of an example implementation 200 of a disposable wristband 102 described herein (e.g., the disposable wristband 102 of FIG. 1). In FIG. 2, a label-side view, a cross-sectional view, and a wrist-side view of the disposable wristband 102 are shown. Similar to example implementation 100, the disposable wristband 102 of FIG. 2 may include a label side 106, a wrist side 108, and a receiving hole pattern 110. Furthermore, as shown, the label side 106 may include a print coating 120 that is laminated or attached to a printable section 118 of a wristband material 202 of the disposable wristband 102. In FIG. 2, the wrist side 108 may include an adhesive material 126 on an adhesive section 128 and a comfort coating 134 that is laminated or attached to the wristband material 202. As further shown in FIG. 2, the adhesive section 128 may include a configuration of cuts 132, and/or a width of the adhesive section 128 may be narrower than the maximum width WM of the disposable wristband 102.

As shown in the cross-sectional view of the disposable wristband 102 in FIG. 2, the disposable wristband 102 may have a maximum thickness T that is less than 0.5 mm. In some implementations, a thickness of the wristband material 202 may be thicker than a thickness of the print coating 120, a thickness of the comfort coating 134, and/or a combined thickness of the print coating 120 and the comfort coating 134. The cross-section of the cross-sectional view may be at a central longitudinal axis 204 of the disposable wristband 102 that extends from a first end 206 to a second end 208 that is opposite the first end 206. The central longitudinal axis 204 may be parallel to the longitudinal direction of the disposable wristband 102.

A length of the disposable wristband 102 may correspond to a distance between the first end 206 and the second end 208. The length of the disposable wristband 102 may be any suitable length, depending on a size of an intended wearer's wrist (or other body part that is to receive the disposable wristband 102). Similar to example implementation 100, as shown in FIG. 2, a maximum width WM of the disposable wristband 102 may correspond to a lateral distance (e.g., a distance that is perpendicular to the central longitudinal axis 204) between a first edge contour 122 and a second edge contour 124 of the disposable wristband 102.

The receiving hole pattern 110 includes holes 210 that extend from the label side 106 to the wrist side 108. The holes 210 may be arranged according to an arrangement of pegs on an accessory that is to be attached to the disposable wristband 102 of FIG. 2. In some implementations, an individual hole 210 of the receiving hole pattern 110 may have a diameter that is greater than a percentage threshold of the maximum width of the disposable wristband 102. For example, the holes may each have a diameter that is 1 mm, or a diameter that is at least 5% of the maximum width of the disposable wristband 102. As shown in FIG. 2, the receiving hole pattern 110 may be centrally positioned between the first end 206 and the second end 208. In some implementations, the receiving hole pattern 110 may be positioned nearer the first end 206 than the second end 208 (or nearer the second end than the first end 206). For example, to account for a label being printed to the disposable wristband 102 and/or the adhesive section 128 being positioned at the first end 206, as shown in FIG. 1, the receiving hole pattern 110 may be positioned nearer the first end 206 than the second end 208.

In some implementations, to ensure that the disposable wristband 102 (and/or a material of the wristband material 202) maintains or has a configured amount of strength to support an access, the holes 210 of the receiving hole pattern 110 (e.g., each hole or all holes of the receiving hole pattern 110) may be at least a threshold lateral distance from the first edge contour 122 and the second edge contour 124. The threshold lateral distance may be a distance that is at least a certain percentage (e.g., a threshold percentage, such as at least 33%) of the maximum width of the disposable wristband 102. In this way, the holes 210 of the receiving hole pattern 110 may be positioned to secure an accessory to the disposable wristband 102 by reducing a likelihood of a peg of the accessory tearing from a hole of the receiving hole pattern 110 to an edge contour of the disposable wristband 102.

Additionally, or alternatively, a distance DH between the holes 210 may be configured to maintain the configured amount of strength. Correspondingly, a distance between a set of pegs of an accessory (e.g., the accessory 104) that is to be attached to the disposable wristband 102, as described elsewhere herein, may be configured to maintain the configured amount of strength.

In some implementations, the receiving hole pattern 110 is formed by a die cast press of the wristband material 202. The die cast press may involve a manufacturing operation that forms one or more of the edge contours and/or that forms the configuration of cuts 132. For example, the die cast press may utilize a die cast that is configured to form the receiving hole pattern, the first edge contour 122, the second edge contour 124, and the configuration of cuts 132. The die cast press may be performed before or after the print coating 120 is and/or applied to the wristband material 202. Additionally, or alternatively, the die cast press may be performed before or after the comfort coating is applied to the wristband material 202.

The central longitudinal axis 204 may correspond to a sensed region of the disposable wristband 102 that longitudinally extends a length of the disposable wristband 102. For example, the sensed region may correspond to a portion of the disposable wristband 102 (e.g., a portion of the disposable wristband 102 that is within a lateral distance of the central longitudinal axis 204) that is analyzed by a sensor of a wristband printer during a printing operation. For example, the sensed region may be aligned with the sensor to permit the sensor to detect the presence of the disposable wristband 102. In this way, to prevent a wristband printer from interrupting a printing operation involving the disposable wristband 102, the holes 210 of the receiving pattern may be positioned within the disposable wristband 102 outside of the sensed region of the disposable wristband 102. For example, as shown in FIG. 2, the receiving hole pattern 110 may include two holes 210 (which may be positioned and/or configured on the disposable wristband 102 to receive a corresponding accessory with a set of pegs that align with the two holes 210).

To prevent interruption of a printer operation and maintain a desired strength of the disposable wristband 102 to support an accessory, the holes 210 may be aligned in parallel to the central longitudinal axis 204 of the disposable wristband 102. Additionally, or alternatively, in other example receiving hole patterns, to prevent interruption of the printer operation, holes (e.g., each hole or all holes of the receiving hole pattern) may be at least a threshold distance from the sensed region and/or may satisfy a lateral distance threshold from the first edge contour 122 and/or the second edge contour 124. Accordingly, during a printing operation, the printer may not misinterpret a detection of one or both of the holes 210 as an end of the disposable wristband 102 (e.g., the first end or the second end) while maintaining a desired strength of the wristband material 202.

As indicated above, FIG. 2 is provided as an example. Other examples may differ from what is described with regard to FIG. 2.

Figure 3:
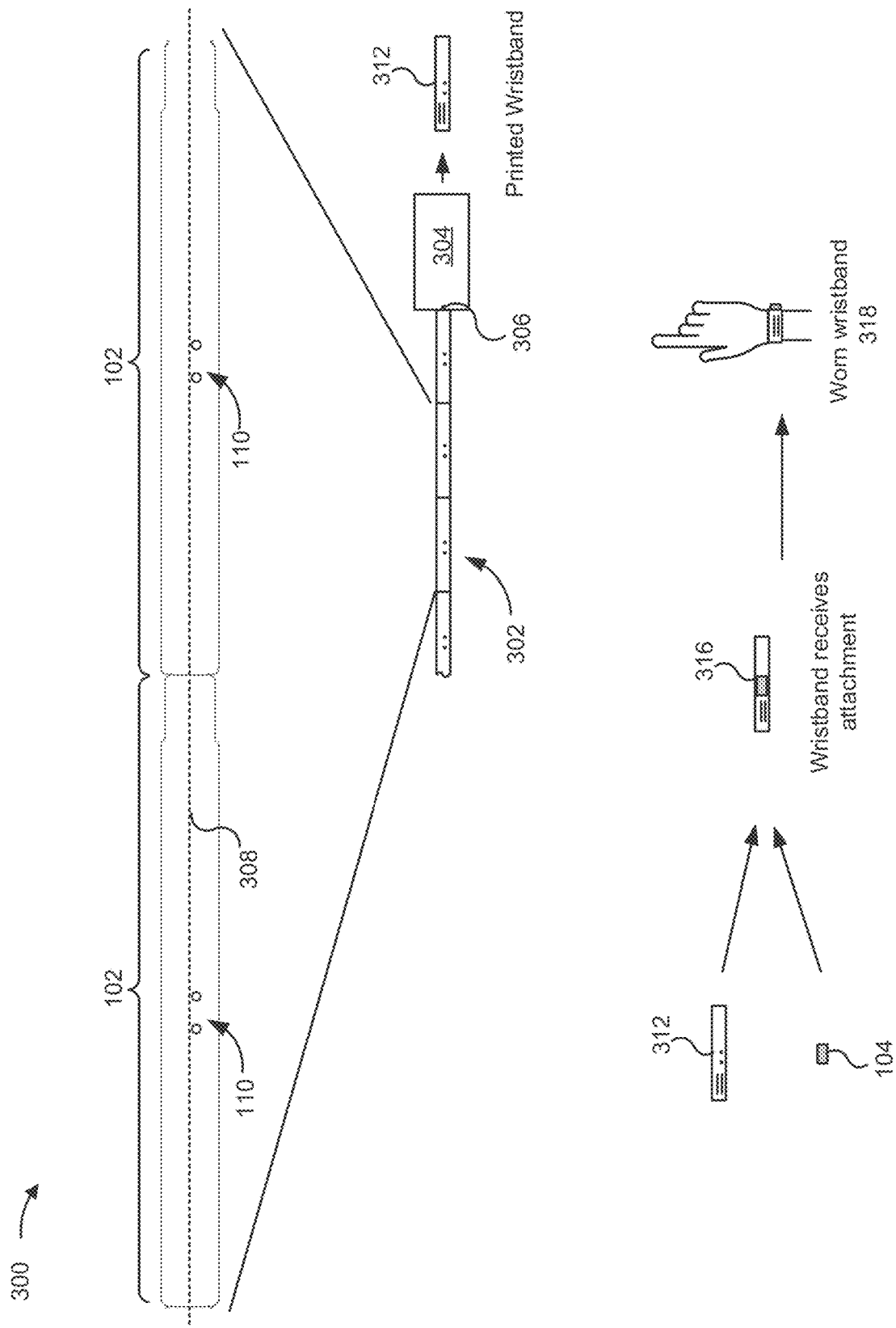
FIG. 3 is a diagram of another example implementation associated with a disposable wristband described herein.

FIG. 3 is a diagram of an example implementation 300 associated with a disposable wristband. As shown in FIG. 3, example implementation 300 includes a wristband web 302 and a wristband printer 304.

The wristband web 302 includes a plurality of disposable wristbands 102 (e.g., wristbands that correspond to the disposable wristband 102 described elsewhere herein). An individual disposable wristband 102 (or each of the disposable wristbands 102) may include a receiving hole pattern 110. The wristband printer 304 may include a sensor 306 that defines a sensed region 308 of the wristband web 302.

The wristband web 302 may include the wristband material 202, the print coating 120, and the comfort coating 134, as described elsewhere herein. For example, the disposable wristband 102 may be formed via a manufacturing operation (e.g., a die cast press) that configures the wristband web 302 to include the plurality of disposable wristbands 102. In example implementation 300, the individual disposable wristbands 102 of the plurality of wristbands are arranged end-to-end along a length of the wristband web 302. In other examples, the plurality of wristbands may be arranged in a wristband sheet configuration (e.g., side-by-side).

As shown in FIG. 3, a disposable wristband 102 may be formed from the wristband web 302 to permit a wearer to wear the disposable wristband 102. For example, a disposable wristband 102 may be formed for a particular wearer and/or for a particular purpose (e.g., to identify a wearer of the wristband and/or receive an accessory that is associated with the purpose). Accordingly, a printed wristband 312 may be formed by feeding the wristband web 302 into the wristband printer 304 and causing the wristband printer 304 to perform a print operation that prints a label onto the disposable wristband 102. The print operation may not be interrupted due to holes of the receiving hole pattern 110 being outside of the sensed region 308, as described herein.

As further shown in FIG. 3, the printed wristband 312 may receive an accessory 104 to form an accessorized disposable wristband 316. For example, pegs of the accessory 104 may be received through holes of the receiving hole pattern 110 (which may have holes that are sized, shaped, and/or arranged in a corresponding manner as the pegs), thereby securing the accessory 104 to the disposable wristband 102 (e.g., in association with a backing, in association with an end of the pegs having a slightly larger diameter than corresponding holes of the receiving hole pattern 110) or other type of device). In this way, as shown by reference number 318, the accessorized disposable wristband 316 may be configured for a single use by a wearer using a wristband printer and an accessory without having to reconfigure the printer to account for the receiving hole pattern, as described herein.

As indicated above, FIG. 3 is provided as an example. Other examples may differ from what is described with regard to FIG. 3. The number and arrangement of devices shown in FIG. 3 are provided as an example.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wristband, comprising:
   a first side that includes a printable section of the wristband that includes a print coating;
   a second side, opposite the first side, that includes:
      a comfort coating,
      a sensed region that longitudinally extends a length of the wristband, and
      an adhesive material on an adhesive section of the wristband; and
   a receiving hole pattern that is configured to:
      receive an accessory associated with the wristband to enable the accessory to be attached to the wristband when worn by a wearer,
   wherein at least one hole of the receiving hole pattern is positioned outside of the sensed region.

2. The wristband of claim 1, wherein the sensed region corresponds to a portion of the wristband that is analyzed by a sensor of a wristband printer during a printing operation.

3. The wristband of claim 1, wherein the sensed region is centered along a central longitudinal axis of the wristband.

4. The wristband of claim 3, wherein a first one of the holes and a second one of the holes are aligned on a line that is parallel to and offset from the central longitudinal axis.

5. The wristband of claim 1, wherein the wristband has a first edge contour extending along a longitudinal direction of the wristband and a second edge contour extending along the longitudinal direction,
   wherein all holes of the receiving hole pattern are at least a lateral distance threshold from the first edge contour and the second edge contour.

6. The wristband of claim 5, wherein the distance threshold corresponds to a certain percentage of a maximum width of the wristband,
   wherein the maximum width of the wristband is defined by the first edge contour and the second edge contour.

7. The wristband of claim 5, wherein the wristband has a first end and a second end that is opposite the first end,
   wherein the adhesive section is disposed at the first end, and
   wherein the receiving hole pattern is positioned nearer the first end than the second end.

8. The wristband of claim 1, wherein, to enable the wristband to be worn by an individual, the adhesive material is configured to be attached to the second side of the wristband to cause a portion of the printable section to overlap the adhesive section.

9. The wristband of claim 1, wherein the receiving hole pattern includes multiple holes that are configured within the receiving hole pattern and that are arranged to receive corresponding pegs of the accessory.

10. The wristband of claim 1, wherein the comfort coating comprises a polypropylene coating that is laminated to the wristband.

11. The wristband of claim 1, wherein the receiving hole pattern is formed by a die cast press that forms one or more edge contours of the wristband.

12. The wristband of claim 1, wherein the wristband is formed of a polyethylene material that receives the print coating and the comfort coating.

13. The wristband of claim 1, wherein the wristband is formed of a wristband material that receives the print coating and the comfort coating,
   wherein the wristband material is configured to have a tensile strength of at least 1.4 kilograms of force per square centimeter.

14. The wristband of claim 1, wherein the adhesive section includes a configuration of cuts that are configured to enable the adhesive material to be attached to the wristband only once.

15. A wristband web, comprising:
   a wristband material;
   a print coating on printable sections of a first side of the wristband material;
   an adhesive material on adhesive sections of the first side of the wristband material;
   a comfort coating on a second side of the wristband material that is opposite the first side of the wristband material; and
   a sensed region that longitudinally extends a length of the wristband web;
   wherein a plurality of wristbands are formed within the wristband web,
   wherein an individual wristband, of the plurality of wristbands, includes a receiving hole pattern for receiving and securing an accessory to the wristband and holes of the receiving hole pattern are positioned outside of the sensed region.

16. The wristband web of claim 15, wherein individual wristbands of the plurality of wristbands are arranged end-to-end along a length of the wristband web.

17. The wristband web of claim 15, wherein the wristband material is formed of a polyethylene material and the comfort coating comprises a polypropylene coating.

18. The wristband web of claim 15, wherein a first one of the holes and a second one of the holes of the receiving hole pattern are aligned on a line that is parallel to and offset from the central longitudinal axis outside of the sensed region.

19. A wristband web, comprising:
  a plurality of wristbands,
  wherein each wristband, of the plurality of wristbands, is formed from the wristband web to include:
    a printable section that includes a print coating on a printable section of a first side of the wristband;
    an adhesive material on an adhesive section of a second side of the wristband that is opposite the first side,
    a comfort coating on the second side of the wristband; and
    a receiving hole pattern that includes holes for receiving and securing individual accessories to each wristband,
  wherein the holes extend from the first side to the second side,
  wherein the second side includes a sensed region that longitudinally extends a length of the wristband web centered along a central longitudinal axis of the wristband web, and
  wherein a first one of the holes and a second one of the holes of the receiving hole pattern are aligned on a line that is parallel to and offset from the central longitudinal axis outside of the sensed region.

20. The wristband web of claim 19, wherein the offset of the first one of the holes and the second one of the holes of the receiving hole pattern from the central longitudinal axis to position the first one of the holes and the second one of the holes outside of the sensed region maintains a strength of the wristband and prevents interruption of the wristband from receiving a printing operation from printer caused by misinterpretation of at least one of the first one of the holes or the second one of the holes being detected as an end of the wristband.

* * * * *